Figure 1:
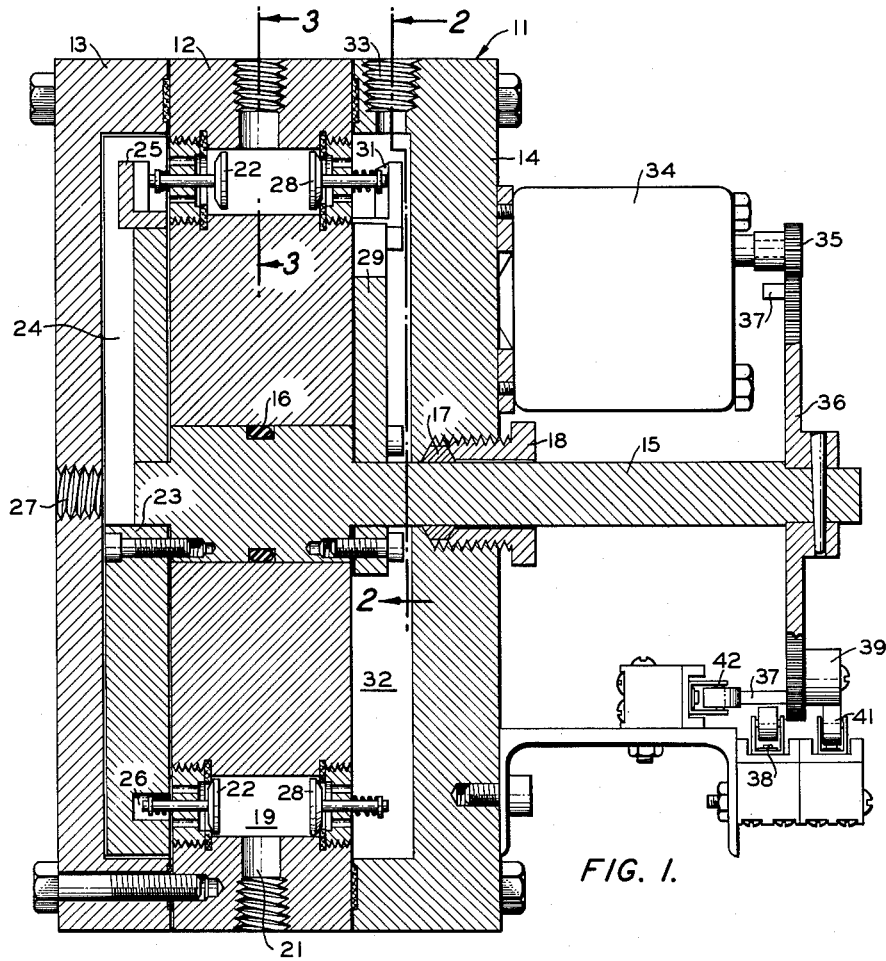

Oct. 25, 1955   W. C. POUPPIRT, JR   2,721,578
MULTISTREAM ROTARY SELECTOR VALVE
Filed Dec. 26, 1950   4 Sheets-Sheet 1

INVENTOR.
W. C. POUPPIRT JR.

BY Hudson and Young

ATTORNEYS

Oct. 25, 1955     W. C. POUPPIRT, JR     2,721,578
MULTISTREAM ROTARY SELECTOR VALVE

Filed Dec. 26, 1950     4 Sheets-Sheet 2

INVENTOR.
W. C. POUPPIRT JR.

BY Hudson and Young

ATTORNEYS

Oct. 25, 1955    W. C. POUPPIRT, JR    2,721,578
MULTISTREAM ROTARY SELECTOR VALVE
Filed Dec. 26, 1950    4 Sheets-Sheet 3

INVENTOR.
W. C. POUPPIRT JR.

BY *Hudson and Young*

ATTORNEYS

Oct. 25, 1955 W. C. POUPPIRT, JR 2,721,578
MULTISTREAM ROTARY SELECTOR VALVE
Filed Dec. 26, 1950 4 Sheets-Sheet 4

INVENTOR.
W. C. POUPPIRT JR.
BY *Hadam and Young*
ATTORNEYS

United States Patent Office 2,721,578
Patented Oct. 25, 1955

2,721,578

MULTISTREAM ROTARY SELECTOR VALVE

Walter C. Pouppirt, Jr., Bartlesville, Okla., assignor to Phillips Petroleum Company, a corporation of Delaware Application December 26, 1950, Serial No. 202,617

5 Claims. (Cl. 137—634)

This invention relates to multistream sampling systems. In one of its more specific aspects it relates to multistream valves. In another of its more specific aspects it relates to a rotary valve with multiple inlet ports and a common outlet to the analyzer. In another of its more specific aspects it relates to a timing circuit for automatically operating multistream valves. In another of its more specific aspects it relates to a valve control circuit including a standardizing circuit and a base line recorder circuit.

It is customary practice to connect sampling lines or conduits leading from the fluid streams to be tested to analyzing apparatus through a valve actuated to successively connect each separate conduit with the analyzing apparatus. In order to obtain a fresh sample from each stream it is necessary to purge each sample line before taking the sample. Some automatic systems continuously purge all sample lines except for the period at which the sample is being taken. Such systems, however, clearly result in an excessive waste of the fluid to be sampled.

During the continuous sampling of the various sample streams it is desirable to know what stream is being sampled and the beginning and end of any series of samples on any plotted record.

An object of this invention is to provide an improved mechanical rotary multistream valve. Another object of the invention is to provide an improved electrical rotary multistream valve. Another object of the invention is to provide an improved electrical circuit for controlling multistream sampling systems. Another object of the invention is to provide an improved circuit for standardizing analyses measurements. Another object of the invention is to provide a circuit for indicating a base line on a single point recorder chart upon each complete revolution of a rotary multistream valve. Other and further objects of this invention will be apparent to those skilled in the art upon study of the accompanying disclosure and drawings.

Broadly speaking this invention comprises an analyzer control system. A multistream rotary selector valve is connected to an infra-red analyzer so as to continuously select and supply to the analyzer one of a plurality of fresh fluid streams for analysis. Rotation of the rotary valve is controlled by a unique timing circuit. As the rotary valve operates, a sample stream passes to an infra-red analyzer and the next stream to be tested is opened for purging. Thus, only a single stream is purged at any one time. A first control circuit is provided which causes a full upstroke to be recorded on the chart at the beginning of every full series of stream analyses. A second control circuit is also provided to cause a full downstroke to be recorded after every analyses except when the first control circuit blocks out the second circuit. At a selected point or points in the series, means are provided whereby current is diverted from recording pen driving means and is diverted to a standardizing circuit for adjusting a bridge in the recording circuit so as to standardize the circuit.

Figure 4:
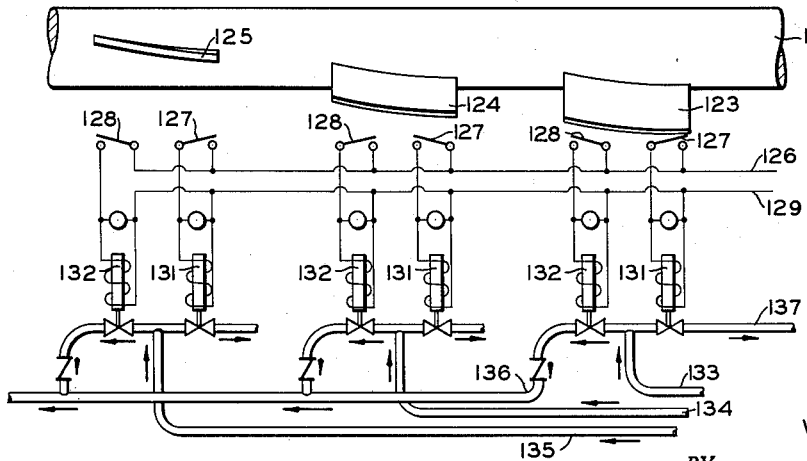
Figure 2:
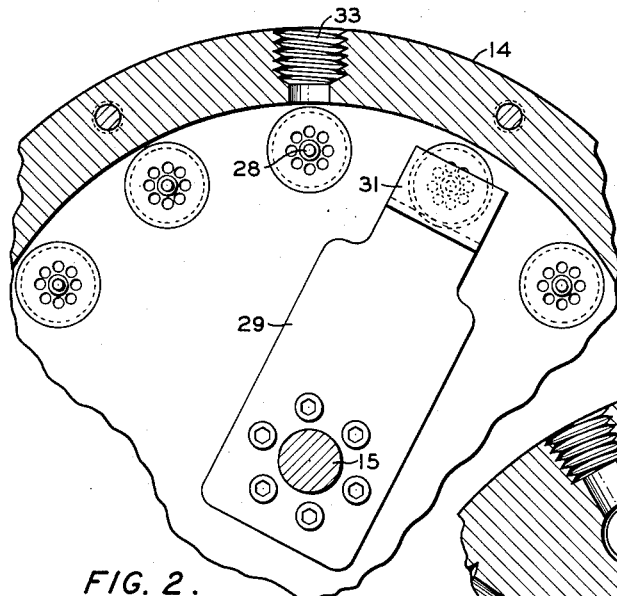
Figure 3:
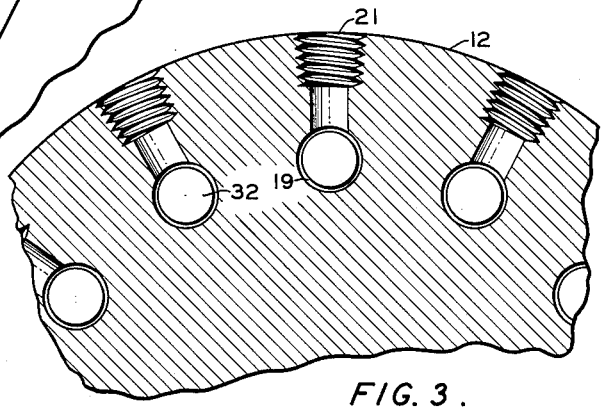
Figure 7:
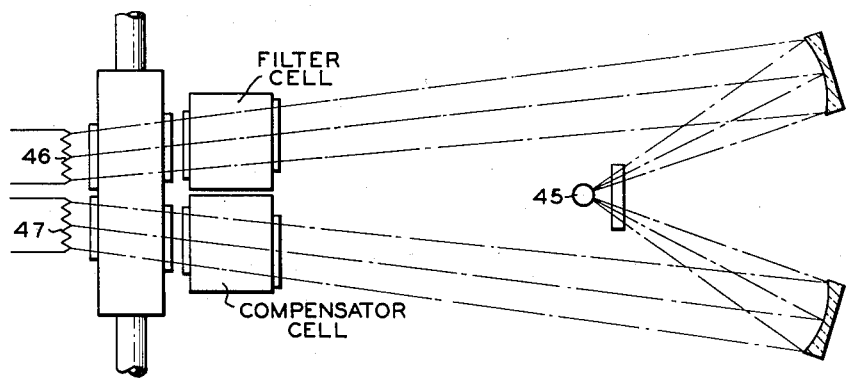
Figure 5:
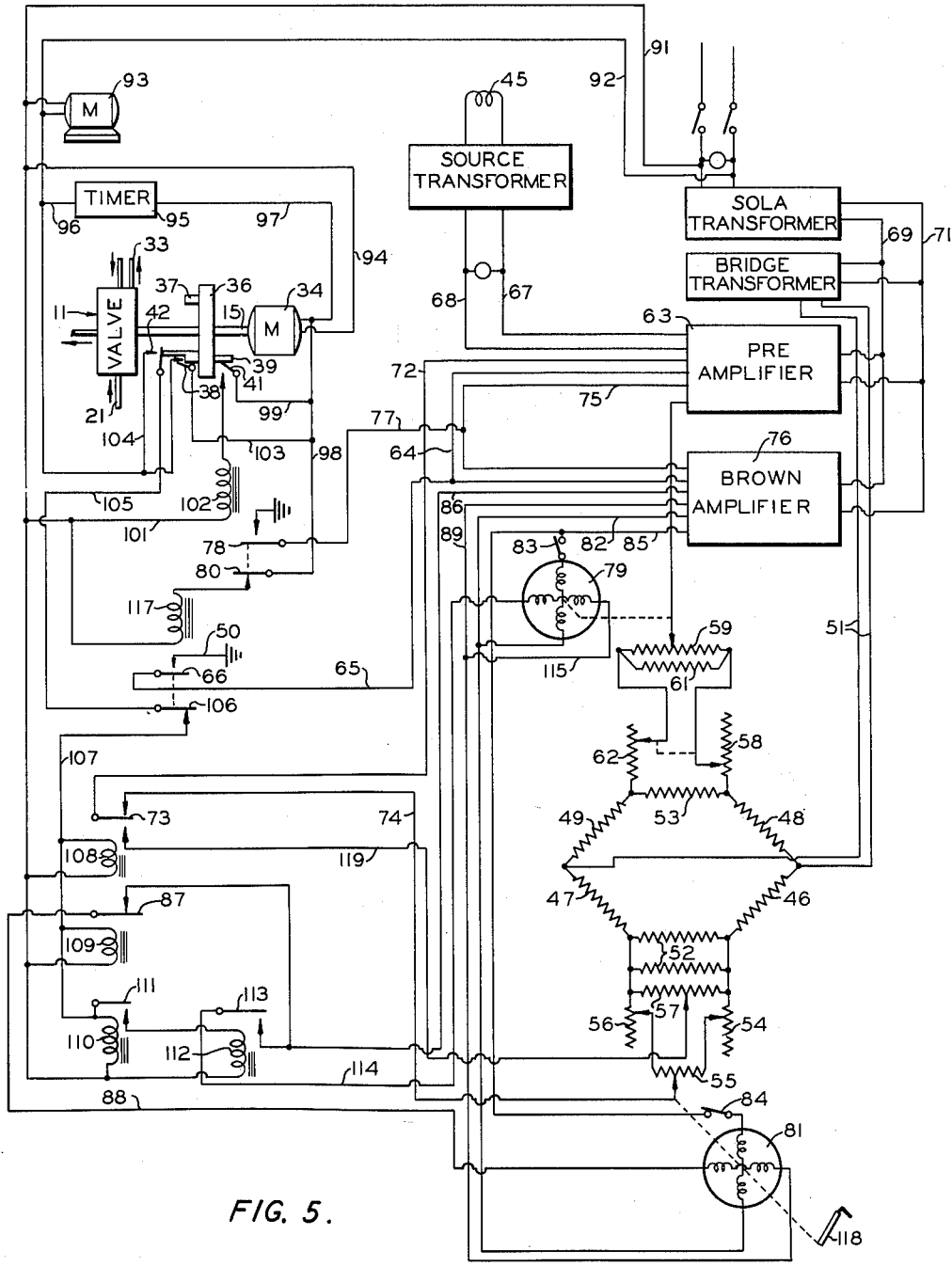
Figure 6:
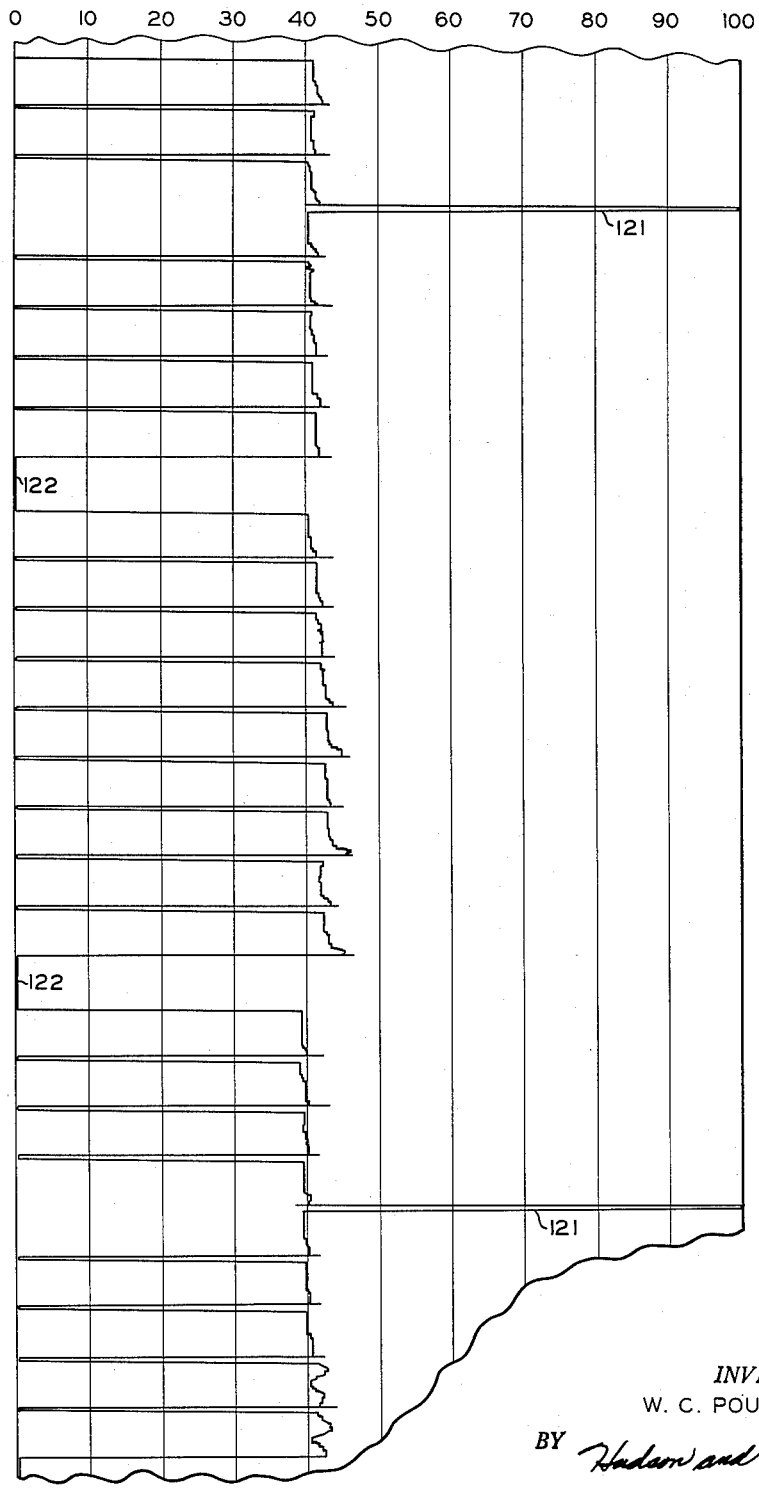

Better understanding of this invention will be obtained upon reference to the diagrammatic drawings in which Figure 1 is an elevational section of a multistream rotary valve of this invention. Figure 2 is a broken section view taken along the line 2—2 of Figure 1. Figure 3 is a broken section view taken along the line 3—3 of Figure 1. Figure 4 is a modification of the multistream valve system of this invention. Figure 5 is a schematic circuit diagram of a control circuit. Figure 6 is a graphical representation of one complete series of analyses including the upstroke base line markings to encompass the series and the markings indicating recording cut-out during bridge balancing for standardization purposes. Figure 7 is a diagrammatic showing of an analyzer which may be used with this invention.

Referring particularly to Figure 1 of the drawings, valve 11 comprises a central body portion 12 preferably having parallel lateral faces on two sides and cover plates 13 and 14 closing its parallel lateral faces. Drive shaft 15 extends axially through plate 14 and through body member 12 and slightly beyond body member 12. Shaft 15 is provided with suitable sealing member 16 for rotation within body member 12. Shaft 15 is supported in plate 14 by a gastight seal comprising packing 17 and follower member 18. A plurality of gas passages 19 are provided through the body member at equally spaced points on a common circle concentric with the axis of said shaft and preferably at right angles to the lateral faces of body member 12. Inlet conduits 21 extend into the body member to the gas passages 19 provided therein, preferably radially to body member 12. Spring loaded poppet type valves 22 are provided in the end of gas passages 19 adjacent plate member 13 and are so mounted that the heads of said valves are retained within passages 19 and the stems of valves 22 extend beyond the face of body member 12 but are enclosed by plate member 13. Metal disc 23 having a diameter smaller than that of plate member 13 is provided between body portion 12 and a portion of plate member 13. Disc 23 is centrally mounted upon shaft 15 and is affixed thereto so as to be rotated by rotation of that shaft. Disc 23 has a slot 24 milled in its outer face from its center portion, preferably radially, out to its circumference. A cut is made through the disc at the outer end of the slot 24 and a cam finger 25 is mounted so as to depress the stems of poppet valves 22 as the cam passes over them upon rotation of disc 23. An annular ring 26 is cut in the inner face of disc 23 so as to clear the stems of the valves 22 not being operated by cam finger 25. Fluid outlet conduit 27 is provided in the center portion of plate member 13.

Poppet valves 28 are mounted in the ends of gas passages 19 adjacent plate member 14 and are so positioned that the heads of valves 28 are retained within gas passages 19 and the stems of those valves extend beyond the face of body member 12 but are encompassed by plate member 14. An arm 29 is mounted on and affixed to shaft 15 and extends radially therefrom between body member 12 and a portion of plate 14. Cam finger 31 is provided at the outer end of arm 29 so as to contact and depress the stems of valves 28 as the cam passes over them. Arm 29 is positioned on shaft 15 so that as cam 25 depresses the stem of one valve 22, cam 31 depresses the stem of a valve 28 in the gas passage next in line in the direction of rotation of shaft 15. Plate 14 is spaced from body member 12 except at its peripheral portion thereof so as to form a gas passage 32 therebetween. Arm 29 and its cam member 31 are adapted so as to rotate in space 32. Purge gas outlet 33 extends preferably radially from gas passage 32. A disc member such as disc 23 can be used instead of arm 29. Such a disc would be provided with a cut-out portion for mounting cam member 31 and a slot would be turned in the inner face of the disc to provide clearance for the valve stems.

Motor 34 is provided and preferably mounted on valve 11 and is operatively connected to shaft 15 so as to provide rotation thereto. Connection between motor 34 and shaft 15 is preferably made by pinion gear 35 mounted on the shaft of motor 34 and gear wheel 36 mounted on shaft 15. Mounted on the side of gear wheel 36 are a plurality of pins 37 which correspond in number to the number of streams to be controlled by valve 11. Pins 37 are equally spaced about the face of gear wheel 36 on a circle concentric with the periphery of wheel 36. Microswitch 38 is provided adjacent the face of gear wheel 36 from which pins 37 extend and is adapted to be opened by pins 37 as they pass over the surface of normally closed microswitch 38 upon rotation of gear wheel 36. One contact member 39 is provided on the face of gear wheel 36 opposite that from which pins 37 extend. Contact member 39 is of such width that it extends from a point on gear wheel 36 opposite one pin 37 to a point opposite an adjacent pin 37. Microswitch 41, normally open, is rigidly mounted so as to be closed by pressure exerted thereon by contact member 39 upon rotation of gear wheel 36. At least one of the pins 37 is longer than the other pins 37. The number of longer pins is dependent upon the number of streams to be sampled and the number of standardizations necessary. One longer pin 37 is required for each standardization of the associated analyzer. If more than one standardization is necessary the longer pins are distributed through the series of pins 37. Microswitch 42, normally open, is rigidly mounted so as to be closed by the longer pins 37 upon rotation of gear wheel 36.

Sample gas from valve 11 flows through outlet 27 to any double-beam radiation type analyzer, not shown. One preferred type analyzer is a double-beam infra-red analyzer such as that shown in Figure 7, and which is fully disclosed in application Serial Number 103,158, filed July 5, 1949, by Joseph W. Hutchins. A source 45, see Figure 5, of infra-red or other suitable radiation is provided for directing two beams through a window against a pair of front surface concave mirrors. The respective beams of radiation are reflected by the mirrors and are then passed through a pair of intermediate cells which are filter and compensator cells and into a test cell to a pair of radiation sensitive devices such as detectors 46 and 47. 46 and 47 may be bolometers, thermocouples, or thermistors. The intermediate cells are provided with windows which are transparent to the radiation used. In the case of infra-red radiation, the windows may be formed from a halide such as silver chloride, calcium fluoride, sodium fluoride, or from quartz. The filter cell, which may have windows formed from Pyrex glass, spinel, or quartz is filled with a pure material or mixture of materials having a principal absorption band at the same frequency as the principal absorption band of the material or component to be measured in the test stream. The compensator cell contains air or other substance transparent to the radiation. The fluid under test is admitted to the test cell through an inlet at one end and is removed therefrom through an outlet at the other end.

The beams of radiation incident upon the bolometers 46 and 47 produce temperature changes therein which in turn vary the electrical resistances of the bolometers. The differential in resistance between the bolometers indicates the amount or percentage of the desired pure material or component found in the mixture in the test cell provided the pure material or component has a principal absorption band at the same frequency as the fluid in the filter cell. This apparatus for producing an impedance differential between two elements which is proportional to the percentage of the component to be tested for is well known in the art and forms no part of the present invention. It is within the scope of the invention to utilize other types of radiation, such as monochromatic light or ultraviolet radiation, so long as an impedance change is produced in the radiation sensitive devices by variations in the composition of the test sample.

It has been found that inaccuracies in the absorption measurement occur as a result of temperature changes, aging of circuit components and other factors. I periodically calibrate the electrical apparatus to compensate for the effect of such factors. To accomplish this end, I have provided means for periodically introducing a standardizing fluid into the test cell of the analyzer in order to obtain a standard reading by which the circuit is automatically adjusted to compensate for factors causing drift.

The bolometers are connected in a Wheatstone bridge circuit with balancing resistors 48 and 49. Leads 51 carrying alternating current have one terminal thereof connected to a junction between units 46 and 48, the other terminal of the source being connected to the junction between units 47 and 49. Series resistors 52 are connected between bolometers 46 and 47 and a series resistor 53 is connected between resistances 48 and 49. Resistors 52 are shunted by a unit including a variable resistor 54, potentiometer 55, variable resistor 56, and potentiometer 57. Potentiometer 57 has one terminal thereof connected to a junction between resistors 52 and variable resistance 54 while the other terminal of potentiometer 57 is connected to a junction between resistors 52 and variable resistor 56. The resistor 53 is shunted by a unit including a variable resistor 58, a potentiometer 59, a fixed resistor 61, and a variable resistor 62.

When an alternating current potential is supplied to the bridge through leads 51, potentiometers 57 and 59 may be adjusted so that there is a zero potential difference therebetween and similarly potentiometers 55 and 59 may be adjusted so that there is a zero potential therebetween. The bridge is then balanced insofar as the contact arms of these potentiometers are concerned. Variable resistors 58 and 62 are connected to a common control shaft in such fashion that rotation of the shaft increases the ohmic value of one variable resistor and decreases the ohmic value of the other variable resistor. Thus, these ganged resistors may be used as an auxiliary bridge balancing control since rotation of the shaft increases the resistance on one side of potentiometer 59 and decreases the resistance on the other side of potentiometer 59. Variable resistors 54 and 56 are also connected to a common control shaft. Adjustment of this shaft, however, either increases or decreases the ohmic value of both resistors simultaneously. This control permits adjustment of the sensitivity of the bridge circuit. Thus, when the resistance of units 54 and 56 is high, full scale movement of potentiometer 55 or 57 produces only a small variation in the balance point of the bridge due to the relatively large series resistance in circuit therewith. When the resistance of units 54 and 56 is small, adjustment of potentiometers 55 and 57 covers a wide range of balance conditions since the series resistance in circuit therewith is relatively small.

The arm of potentiometer 59 is connected to one input terminal of pre-amplifier 63. One output terminal of the pre-amplifier 63 is connected by leads 64 and 65 to a contact of switch 66 which is normally in an open position, and to one input terminal of Brown amplifier 76. Source 45 is connected by a source transformer and leads 67 and 68 to a current regulator tube located in pre-amplifier 63. Obviously these leads could be connected directly to power lines 69 and 71. A second input to pre-amplifier 63 is connected by lead 72 to a terminal of switch 73 which is normally connected by lead 74 to the arm of potentiometer 55. A second output terminal of pre-amplifier 63 is connected by lead 75 to an input terminal of Brown amplifier 76 and by lead 77 to one terminal of switch 78 which is normally open in a down position and is mechanically linked to switch 80. The output of amplifier 76 selectively energizes a pair of motors, Helipot drive motor 79 and pen drive motor 81, which are mechanically connected to the respective control shafts of potentiometers 59 and 55. To this end one output terminal is connected by lead 82 to a first terminal of each of said motors, and another output terminal is connected to a second terminal of each motor through switches 83 and 84 by lead 85. One output terminal of amplifier 76 is connected by lead 86 to one contact of switch 87 which is normally closed in an up position and to one contact of switch 113 which is normally open in an up position. One terminal of switch 87 is connected by lead 88 to a third terminal of pen drive motor 81. An output terminal of amplifier 76 is connected by lead 89 to a fourth terminal of motors 79 and 81.

Power leads 91 and 92 are connected to terminals of chart drive motor 93. Motor 93 drives the chart upon which movement of pen 118 is recorded. Lead 91 is connected to valve drive motor 34 by lead 94. Power lead 92 is connected to timer 95 by lead 96 and timer 95 is connected by lead 97 to motor 34. Lead 97 is connected by lead 98 to one contact of switch 80 which is normally closed in a down position. Lead 99 extends between lead 98 and one contact of switch 41 which is normally open. Lead 101 extends from power lead 91 through relay 102 to the other contact of switch 41. Lead 98 is connected by lead 103 to one contact of switch 38 which is normally closed. Power lead 92 is connected to the other contact of switch 38. Lead 104 connects power lead 92 and one contact of switch 42 which is normally open. Lead 105 extends between one contact of switch 42 and a contact of switch 106. Switch 106 is normally closed in a down position and is mechanically linked to switch 66. The second contact of switch 106 is connected by lead 107 through relays 108, 109, and 110 to power lead 91. Switch 111 is operatively connected to time delay relay 110. One pole of switch 111 is connected through relay 112 to power lead 91. One contact of switch 113 is connected by lead 114 to a third terminal of motor 79, the fourth terminal of motor 79 being connected by lead 115 to an output terminal of amplifier 76 by lead 89. The second contact of switch 113, as described above, is connected by lead 86 to an output terminal of amplifier 76.

Description of the operation of valve 11 can be more clearly set forth in connection with the operation of bridge circuit shown in Figure 5 of the drawings. For the purpose of illustration, it is assumed that 18 streams are to be analyzed. With that number of streams two additional standardization streams are utilized in any one complete series of analyses. Thus, valve 11 is provided with twenty gas passages 19 with the pairs of valves 22 and 28 mounted therein. The fifth and fifteenth pins 37 in the series thereof are longer than the other pins 37 so as to close microswitch 42 which is normally open. Contact member 39 extends, in a direction counter to the rotation of the valve, from a point opposite the twentieth pin 37 to a point opposite the first pin 37 in the series thereof and is slightly shorter than the distance between the two pins 37. For the purpose of description therefore, streams 1 to 4, 6 to 14, and 16 to 20 are active streams and streams 5 and 15 are standardizing gas streams. At the end of the time interval allotted for the analysis of a stream, e. g., stream 4, timer 95 times out and closes a pair of contacts for a predetermined period. This closure of the contacts by timer 95 allows power to be supplied to motor 34. The motor starts rotating the valve to the next stream position and, as the valve is rotated, gear wheel 36, which forms a portion of the connecting linkage between motor 34 and the valve, is also rotated. As gear wheel 36 rotates, a pin 37 is moved out of contact with microswitch 38 so as to allow microswitch 38 to close a circuit around timer 95. The total closed contact time of timer 95 is set so as to be less than that required to rotate gear wheel 36 so as to close one stream and open the next succeeding stream. At the end of its closed contact period of operation timer 95 opens its contacts so as to open the circuit to motor 34. However, as disclosed, microswitch 38 has completed a second circuit to provide power for motor 34 and the motor continues to operate valve 11 until cam members 25 and 31 reach and open their next succeeding valves 22 and 28, respectively. As these valves are opened, the next pin 37 in the series contacts and opens microswitch 38 causing the circuit to motor 34 to be broken and thus stopping the operation of that motor while gas from gas stream 5 is introduced through the selected gas inlet 21, gas passage 19, around valve 22, through gas passage 24, and gas outlet 27 to the analyzer, not shown. Gas from stream 6 passes through similar gas passages past valve 28 and out through purge gas outlet 33. These valves remain open until timer 95 times out once again and causes motor 34 to commence operation.

In addition to starting the operation of motor 34, timer 95, by its closure of the contacts, also completes a circuit which energizes a down-scale drive relay through lead 98 and relay 117. Relay 117 causes switch 106 to open at the same time switch 66 is closed so as to complete a circuit to ground 50. The down-scale side of pre-amplifier 63 is thus grounded through lead 65. Recording pen 118 is thus allowed to move to zero. Thus between each sample of gas the recording pen remains down-scale until relay 117 is de-energized, switch 66 is opened, switch 106 closed, and pen 118 is returned to its normal recording position by drive motor 81, i. e., when microswitch 38 is opened by the next pin 37.

As stream 5 is connected with the analyzer, not shown, microswitch 42 is closed by one of the longer pins 37 and microswitch 38 is concomitantly opened. Opening of microswitch 38 diverts current from relay 117. Closure of microswitch 42 actuates relay 108 through lead 105, switch 106, lead 107, time delay relay 110, and lead 92. Activation of relay 108 causes the arm of switch 73 to be diverted to the switch contact which is connected by lead 119 to the arm of potentiometer 57. Thus, a circuit is completed from the Wheatstone bridge through the arm of potentiometer 59 to pre-amplifier 63 and from the Wheatstone bridge through the arm of potentiometer 57, lead 119, switch 73, and lead 72 to pre-amplifier 63. The output of pre-amplifier 63 is transmitted by leads 64 and 75 to Brown amplifier 76. Relay 109 is also activated by closure of microswitch 42 and causes switch 87 to open.

The opening of switch 87 breaks the circuit from Brown amplifier 76 through lead 86 to the third terminal of pen drive motor 81 through lead 88. At the same time, a delay means of time delay relay 110 goes into operation. At the end of a predetermined delay, the contacts of relay switch 111 are caused to close, thus allowing relay 112 to be energized. When energized, relay 112 causes switch 113 to complete the circuit from Brown amplifier 76 through lead 86 and lead 114 to the third terminal of Helipot drive motor 79. The fourth terminal of Helipot drive motor 79 is connected to Brown amplifier 76 through leads 115 and 89. Thus, one field is activated in that motor. The first and second terminals of Helipot drive motor 79 are connected to Brown amplifier 76 by leads 82 and 85, respectively. Thus, the second field of that motor is energized causing the motor to vary the position of the arm of potentiometer 59 in response to the variation in signal received by pre-amplifier 63 and by Brown amplifier 76 from pre-amplifier 63. Radiation received by bolometers 46 and 47 after passage through the standardizing stream vary the resistance of the bolometers in respect to the variations pointed out above. Thus the bridge circuit is standardized. The time delay, which is incorporated in time delay relay 110, is utilized to allow the sample system to stabilize before setting potentiometer 59 to standardize the bridge. The wiper arm of potentiometer 57 may be adjusted manually to set a point of balance of the bridge circuit.

At the end of the standardizing step timer 95 times in so as to once again actuate motor 34 to cause rotation of gear wheel 36 and valve 11 to the next succeeding pair of valves in the manner described above. Upon movement of gear wheel 36 by motor 34, so as to rotate valve 11 from stream 5 to stream 6, the long pin 37 is moved so as to allow microswitch 42 to open and a shorter pin 37 opens microswitch 38. When microswitch 38 is opened the normal recording circuit is set up from Brown amplifier 76 to pen drive motor 81. The first and second terminals of that motor are connected to terminals of Brown amplifier 76 by means of leads 82 and 85, respectively. Thus a first field of pen drive motor 81 is energized. The fourth terminal of pen drive motor 81 is connected to a terminal of Brown amplifier 76 by means of lead 89. The third terminal of pen drive motor 81 is connected to a terminal of Brown amplifier 76 through lead 88, switch 87, and lead 86. Thus, with both fields of pen drive motor 81 being energized, the motor operates to actuate pen 118 in accordance with the varying current obtained through the bridge circuit, the pre-amplifier, and the Brown amplifier, the current varying in response to resistance change of the bolometers as the beams of radiation incident upon the bolometers 46 and 47 as described above.

The above described steps are repeated for sample and standardization purposes until an analysis has been made of the fluid from the twentieth sample line. As timer 95 times in so as to actuate motor 34 to rotate gear wheel 36 and valve 11 to another series of samples, pin 37 moves out of contact with microswitch 38 and contact member 39 causes microswitch 41 to close. Closure of microswitch 41 causes relay 102 to be energized. Relay 102 causes switch 78 to close and thus ground the up-scale side of pre-amplifier 63 through lead 77. Switch 80, which is connected to switch 78 by mechanical linkage, is caused to open thus preventing relay 117 from being energized. Upon grounding of the up-scale side of pre-amplifier 63, pen drive motor 81 is actuated so as to drive pen 118 in an up-scale sweep. Upon completion of a predetermined time of operation of timer 95 and the breakage of the circuit to motor 34 by opening microswitch 38 upon contact with pin 37, relay 102 is de-energized and pen drive motor 81 returns pen 118 to its normal recording position.

Better understanding of the series of recordings will be obtained upon reference to Figure 6 in which the up-scale recordings are indicated by the numeral 121 and the downscale recordings during standardization are indicated by the numeral 122.

A modification of this invention is set forth in Figure 4 of the drawings. The modification set forth in that figure diagrammatically illustrates a modification of valve 11. In this modification shaft 15 is provided with cams or fin sections 123, 124, and 125 which extend in a staggered helical direction around shaft 15. The drawing diagrammatically shows shaft 15 as being adapted for rotation in a counter-clockwise direction, looking from right to left. The end of each cam or fin which is extended further in the direction of shaft rotation is on the same longitudinal line as the next preceding fin end extending further in the direction counter rotation of the shaft. These fins may be divided so that a single fin actuates each switch. In such construction the fins extend in a staggered helical direction around said shaft. Lead 126 is connected to one contact of switches 127 and to one contact of switches 128. Lead 129 is connected through solenoid valves 131 to the other pole of each microswitch 127 and through solenoid valves 132 to the other contact of each switch 128. Leads 126 and 129 are connected to a power source, not shown. Sample lines 133, 134, and 135 are connected to line 136 at points between pairs of solenoid valves 131 and 132. An indicator is shunted across the leads to each solenoid so as to indicate which valves are in operation.

In the operation of the valve shown in Figure 4, shaft 15 rotates so as to cause fin 123 to close the first microswitch 127. First solenoid valve 131 is actuated and opened by the completion of the circuit through the first switch 127 and allows gas from line 133 to be purged through line 137. As timer 95 times in, as described above, shaft 15 is rotated by motor 34 and the left hand end of fin 123 closes the first microswitch 128 as the right hand end of fin 123 allows the first microswitch 127 to open. Fin 124 is positioned so that the right hand end of that fin closes the second microswitch 127 and first microswitch 128 is closed at the same time. When the first microswitch 127 is opened the first solenoid valve 131 is closed. When first microswitch 128 is closed first solenoid valve 132 is opened. Thus a fluid sample from line 133 passes through the first solenoid valve 132 and line 136 to an analyzer, not shown. At the same time fluid from line 134 is purged through the second solenoid valve 131 which is opened by closure of the second microswitch 127. Further rotation of shaft 15, in response to the operation of the electrical circuit described in connection with Figure 5 of the drawings, causes the microswitch 127 of one pair of microswitches to be opened as the microswitch 128 of that pair of microswitches is closed and the microswitch 127 of the next succeeding pair of microswitches is closed. In this manner a single fluid stream is continuously purged immediately before it is diverted to the analyzer.

This invention has been specifically described so as to fully set forth the specific function of the apparatus. Upon study of the accompanying disclosure and the schematic drawings, many modifications will be at once apparent to those skilled in the art. This system can be modified for use in connection with almost any type of analyzer. It is believed that these modifications are clearly within the spirit and the scope of this application.

I claim:

1. A miltistream rotary valve assembly comprising a body member having flat parallel faces on two opposite sides; a drive shaft extending through the central portion of said body member at right angles to said parallel faces, said shaft being rotatably mounted therein; a plurality of gas passages extending through said body member at right angles to said parallel sides and equally spaced about a circle which is concentric with said drive shaft; a spring loaded poppet valve mounted in a normally closed position in each end of each said gas passage, the head of each said valve being retained within said gas passage and each valve stem extending beyond said flat faces of said body member; an inlet conduit extending into each said gas passage; a first cam member mounted on said drive shaft and extending along a first said parallel face of said body member to a point separated from said drive shaft by a distance at least as great as the distance separating said valve stems from said drive shaft; a first cover plate affixed by a gas tight seal at its periphery to said first parallel face and spaced from said face except at its periphery so as to allow said first cam member to be rotated therebetween; a gas outlet in said first cover plate; a second cam member mounted on said drive shaft and extending along the second said parallel face of said body member to a point separated from said drive shaft by a distance at least as great as the distance separating said valve stems from said drive shaft, said second cam member being offset in the direction of rotation equal to the distance between two adjacent valve stems extending through said second parallel face; a second cover plate affixed by a gas tight seal at its periphery to said second parallel face and spaced from said face except at its periphery so as to allow said first cam member to be rotated therebetween; a gas outlet in said second cover plate; and means to rotate said drive shaft.

2. The valve assembly of claim 1, wherein said gas outlet in said first cover plate is disposed in the central portion thereof; a disc member mounted on said shaft, closely fitted between said first cover plate and said first parallel face; a gas passage slot in said disc extending from said gas outlet in said cover plate to the periphery of said disc; an opening in said disc opposite said valve stems, said first cam member being mounted in said opening; and an annular slot milled in the face of said disc adjacent said first parallel face enclosing the ends of said valves which extend through said first parallel face.

3. The valve assembly of claim 2, wherein said gas passage slot in said disc extends radially across said disc.

4. A multistream rotary valve assembly comprising a body member; a drive shaft extending through the central portion of said body member, said shaft being rotatably mounted therein; a plurality of gas passages extending through said body member parallel to said drive shaft and equally spaced about a circle which is concentric with said drive shaft; a spring loaded poppet valve mounted in a normally closed position in each end of each said gas passage, the head of each said valve being retained within said gas passage and each valve stem extending beyond said body member; an inlet conduit extending into each said gas passage; a first cam member mounted on said drive shaft on one side of and extending along said body member to a point separated from said drive shaft by a distance at least as great as the distance separating said valve stems from said drive shaft; a first cover plate affixed by a gas-tight seal at its periphery and spaced from said body member except at its periphery so as to allow said first cam member to be rotated therebetween; a gas outlet in said first cover plate; a second cam member mounted on said drive shaft and extending along the side of said body member opposite that side which is adjacent said first cam member to a point separated from said drive shaft by a distance at least as great as the distance separating said valve stems from said drive shaft, said second cam member being offset in the direction of rotation of said shaft equal to the distance between two adjacent valve stems extending through one side of said body member; a second cover plate affixed by a gas-tight seal at its priphery to said body member and spaced from said body member except at its periphery so as to allow said first cam member to be rotated therebetween; a gas outlet in said second cover plate; and means to rotate said drive shaft.

5. A multistream rotary valve assembly comprising, in combination, a multiplicity of sample lines, a single purge conduit, a single inlet conduit adapted for connection to an analyzer, and valve mechanism arranged to connect said sample lines, in succession, to said purge conduit, each sample line being connected to said inlet conduit immediately after it is disconnected from said purge conduit, said valve mechanism including a body member, a shaft extending through the central portion of said body member, means defining a plurality of passages in said member equally spaced from said shaft and extended circumferentially thereabout, each passage extending through said body member, a purge valve mounted at one end of each passage, an inlet valve mounted at the other end of each passage, each valve having an actuating member protruding outwardly from said body member, a plurality of sample lines connected to the respective passages, a housing forming a sealed enclosure common to all said purge valves, a housing forming a sealed enclosure common to all of said inlet valves, a cam secured to said shaft at one side of said body member and arranged to successively engage the actuating members of said inlet valves, a cam secured to said shaft at the other side of said body member and arranged to successively engage the actuating members of said purge valves, said cams being staggered so that, with respect to successive passages, the purge valve is opened, the purge valve is closed and the inlet valve is opened, and the inlet valve is closed, and means for effecting relative rotary movement between the shaft and the body member.

References Cited in the file of this patent

UNITED STATES PATENTS

| | | |
|---|---|---|
| 2,333,934 | Jacobsen | Nov. 9, 1943 |
| 2,354,960 | Morehouse | Aug. 1, 1944 |
| 2,506,535 | Zaikowski | May 2, 1950 |
| 2,547,212 | Jamison | Apr. 3, 1951 |